Patented May 16, 1944

2,348,837

UNITED STATES PATENT OFFICE 2,348,837

METHOD OF PREPARING COCOA AND CHOCOLATE PRODUCTS

Johan Ernst Nyrop, Copenhagen, Denmark; vested in the Alien Property Custodian

No Drawing. Application March 31, 1941, Serial No. 386,189. In Denmark April 18, 1940

8 Claims. (Cl. 99—26)

This invention relates to methods of preparing cocoa and chocolate products.

In the preparation of such products cacao beans are roasted and cracked and the inner kernels, called the nibs, are separated from the shells. By grinding the kernels there is produced a dark oily liquid (called "chocolate liquor" in the art), which hardens into the bitter cacao mass containing about 55% cacao fat. When the cacao mass is treated in hydraulic presses under pressures of up to 600 atmospheres, some of the fat is squeezed out, and a residue containing 10 to 25% of fat is left. This residue, the press-cake, forms a hard mass which is difficult to break up. It is generally ground into a fine powder called cocoa powder.

From the cacao mass, cacao fat and sugar and other ingredients chocolate is manufactured by an elaborate disintegration process, wherein use is made of calenders or conches or sieves. When milk chocolate is being produced milk powder or the like is mixed with the sugar and the cacao mass. Cocoa is often prepared with a solution of potash so that the powder becomes darker and, it is said, more soluble.

In the pressing of the cacao mass, in powdering the press-cake, and in disintegrating and conching or sifting mixtures containing bitter mass and sugar, and in the manufacture of milk chocolate from milk powder, heavy machinery must be employed and a large quantity of power is required. Furthermore, it is difficult to produce cocoa with a low percentage of fat, so that the yield of cacao mass from the bitter fat is not always as high as may be desirable.

The object of the present invention is to decrease the power consumed, and to make it possible to produce cocoa powder with a higher solubility (i. e. mixing more readily and more permanently with water) and with a decreased fat content, and the invention consists essentially in a method of preparing cocoa and chocolate products wherein cacao mass is dissolved or dispersed and/or emulsified in water or solution (i. e., in an "aqueous liquid"), the dispersion or liquid produced being separated into one fraction containing most of the fat, and one or two fractions with a low fat content, one or more of the fractions being dried to produce the desired product.

In one method according to the invention the cacao mass is mixed with water or a solution at a suitable temperature, and with a suitable hydrogen ion concentration, or with milk or the like. (Milk is of course an example of an "aqueous liquid".) The mixing is done in a mixing pan, kneading machine or emulsifier, which may conveniently be heated, and if desired steam may be blown into the mixture. In this manner an emulsion is formed which is passed through a separator which may be electrical or centrifugal although it may be preferable to use a centrifugal separator which is able to discharge the material collected in the centrifugal bowl without stopping the machine. One or more of the discharges from the bowl of the separator may be hermetic or foamless.

The emulsion may be thereby divided into fractions by the separator as follows:

Either
A (1) A cream containing part or most of the cacao fat and
 (2) A skim or remainder containing the cocoa solids of the cacao mass, or
B (1) A cream containing most of the cacao fat,
 (2) A skim or watery remainder containing the soluble parts of the cocoa, and
 (3) A sludge containing the insoluble parts of the cocoa, or
C (1) Cacao fat and
 (2) A skim, or a skim and a sludge, containing all the cocoa solids in a dissolved or dispersed state.

To facilitate the separation of the emulsion into fractions the hydrogen ion concentration may be adjusted prior to separation, or sugar or other soluble substances may be added to increase the specific gravity of the emulsion.

Cocoa powder may be produced by drying the skim and/or sludge produced by the separation of the emulsion. Powder is made directly if spray drying is employed, so that the need for grinding is avoided. Before drying it the skim or sludge may be treated with alkali or by colloid milling or the like. If milk or sugar or similar substances such as are generally used in the preparation of cup chocolate are mixed with or dissolved in the skim or sludge, or if fats are emulsified into them, spray drying produces powders which can be directly used for making cup chocolate.

The cacao fat which is produced when the separation is carried out as in example C is in a very clean condition, when the temperature of the emulsion is kept above 30° centigrade. If the fat is in a creamy state (i. e. emulsion), as in Examples A and B, a repeated separation or churning may be used to produce the fat, or it may be recovered by squeezing the powder produced by drying the cream.

When chocolate is to be produced the skim and the sludges are mixed and sugar or other substances are dissolved therein. If milk chocolate is being made milk or milk powder is added to the liquid, which is then sprayed or atomized in warm gas or air, and simultaneously cacao melted mass and/or cacao fat and/or the cream rich in fat may also be atomized in the gas or air by means of the same or another atomizer, preferably without the two being mixed before atomization. Prior to the atomization or separation the products may be homogenized, for instance by the employment of a colloid mill, so that the texture of the products is as fine as possible.

By the atomization of the two separate fractions in warm gas or air, i. e. by spray drying the two components, there may be produced either (1) A powder of cocoa solids or cocoa and milk solids and sugar or the like, each grain being covered with fat, or (2) A powder which is a thorough mixture of two different powders, one containing the cocoa solids, sugar and the like, and the other very rich in fat. The powders may in conventional manner be worked, kneaded, shifted or conched, or milled or homogenised, or passed through a colloid mill, to produce chocolate that can be readily moulded.

Although it is known to manufacture chocolate from the usual initial materials in liquid form by spray drying, a method wherein a separation process is employed to produce directly the liquid products to be atomized or otherwise dried is not known.

I declare that what I claim is:

1. The method of preparing cocoa and chocolate products, consisting in mixing cacao mass with an extraneous aqueous liquid in such proportions as to form a readily flowable liquid, and separating the mixture produced into one fraction containing cacao fat, and other fractions with a low fat content, and subsequently drying the fractions with low fat content to produce the desired material, without previously mixing the same with the said fraction containing the cacao fat.

2. The herein described process which comprises forming a liquid flowable emulsion of cacao mass in an aqueous liquid then centrifugally separating a material containing cacao fat from said emulsion, and drying the aqueous fraction so separated, separately from the said material containing cacao fat.

3. A process of preparing cocoa and chocolate products which comprises emulsifying completely ground cacao mass with an extraneous aqueous liquid in such proportions as to form a free-flowing liquid mass, separating the emulsion thereby formed into three fractions, one of said fractions containing most of the fatty material of the cacao mass, another of said fractions containing the major part of the soluble components of the cacao mass and another of said fractions containing the major part of the insoluble non-fatty components of the cacao mass, and thereafter drying both of said two last named fractions without premixing said fractions to be dried.

4. A process of preparing cocoa and chocolate products which comprises emulsifying completely ground cacao mass with an extraneous aqueous liquid in such proportions as to form a free-flowing liquid mass, separating the emulsion thereby formed into three fractions, one of said fractions containing most of the fatty material of the cacao mass, another of said fractions containing the major part of the soluble components of the cacao mass and another of said fractions containing the major part of the insoluble non-fatty components of the cacao mass, and thereafter spray-drying in a current of a warm gaseous medium, both of said two last named fractions without premixing said fractions to be dried.

5. A process as in claim 3, the steps of mixing together and homogenizing the fraction containing the soluble components of the cacao mass and the fraction containing the insoluble non-fatty components of the cacao mass, and thereafter spray-drying this homogenized mixture.

6. The process of claim 3, in which the separation of the emulsion into the stated fractions is performed electrically.

7. The process of claim 3, in which the separation of the emulsion into the stated fractions is effected by centrifugal force.

8. A process as covered in claim 1, in which the fractions with low fat content are mixed together and homogenized, and this homogenized mixture is then spray-dried, and in which treatment at least one material selected from the group consisting of sugar, milk, and milk solids is added at a stage prior to said spray-drying.

JOHAN ERNST NYROP.